P. BUTLER.
FEED REGULATOR FOR CONCRETE MACHINES.
APPLICATION FILED MAR. 27, 1912.

1,046,437.

Patented Dec. 10, 1912.

2 SHEETS—SHEET 1.

WITNESSES:

INVENTOR
Palace Butler
BY
ATTORNEYS.

P. BUTLER.
FEED REGULATOR FOR CONCRETE MACHINES.
APPLICATION FILED MAR. 27, 1912.
1,046,437.
Patented Dec. 10, 1912.
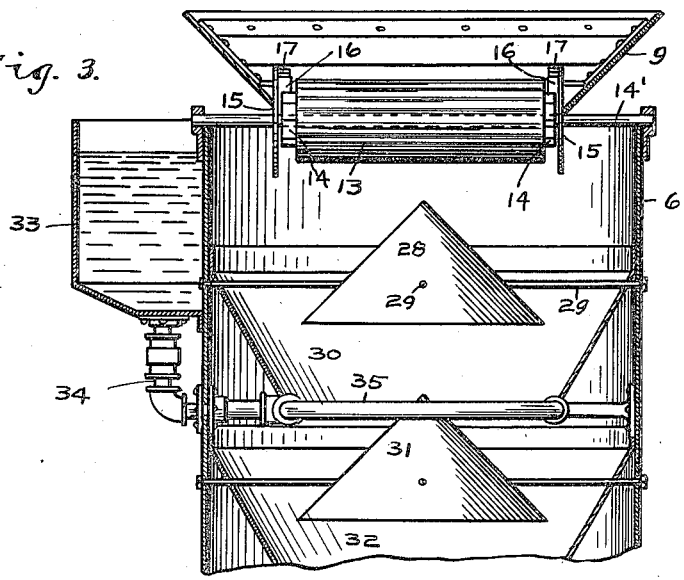
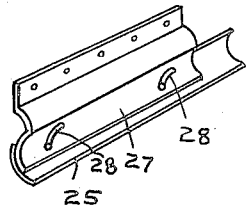
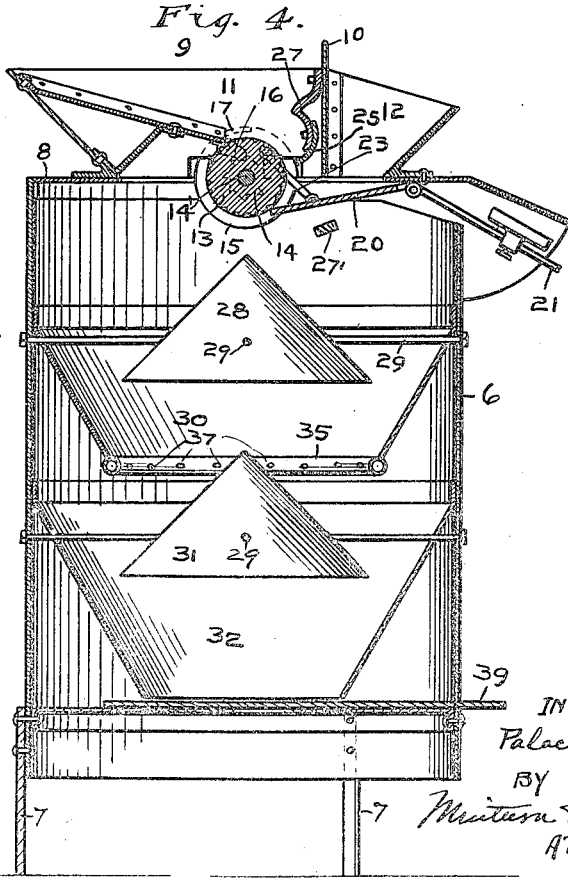
WITNESSES.
INVENTOR
Palace Butler
BY
ATTORNEYS.

UNITED STATES PATENT OFFICE.

PALACE BUTLER, OF INDIANAPOLIS, INDIANA, ASSIGNOR OF ONE-HALF TO GUY R. ELLIOTT, OF INDIANAPOLIS, INDIANA.

FEED-REGULATOR FOR CONCRETE-MACHINES.

1,046,437.  Specification of Letters Patent.  Patented Dec. 10, 1912.

Application filed March 27, 1912. Serial No. 686,590.

*To all whom it may concern:*

Be it known that I, PALACE BUTLER, a citizen of the United States, residing at Indianapolis, in the county of Marion and State of Indiana, have invented certain new and useful Improvements in Feed-Regulators for Concrete-Machines, of which the following is a specification.

This invention relates to improvements in machines for mixing concrete.

The object is to provide a simple, inexpensive, and portable machine in which sand or gravel is deposited by the shovelful and the proper quantity of cement automatically added to each shovelful of sand or gravel, the ingredients thoroughly mixed in a dry state and then mixed with water and discharged from the machine ready for use.

I accomplish the above object by the mechanism illustrated in the accompanying drawings, in which—

Figure 1:
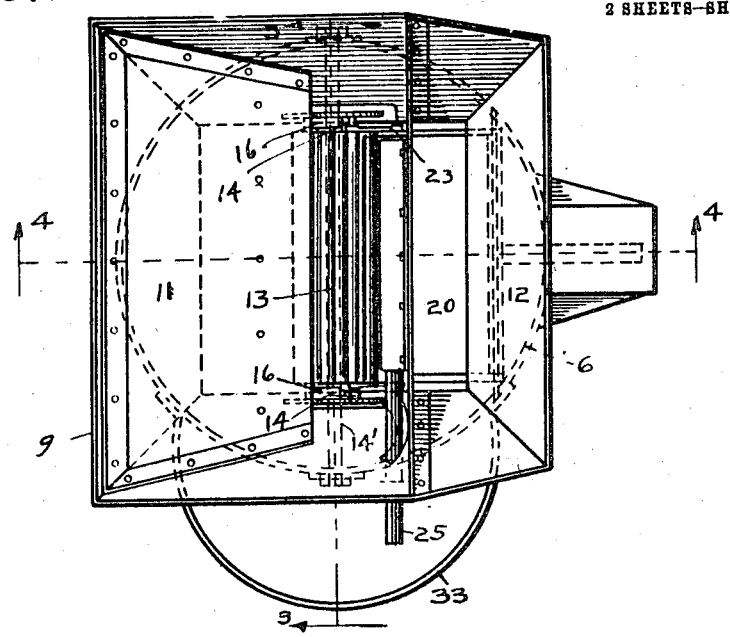
Figure 2:
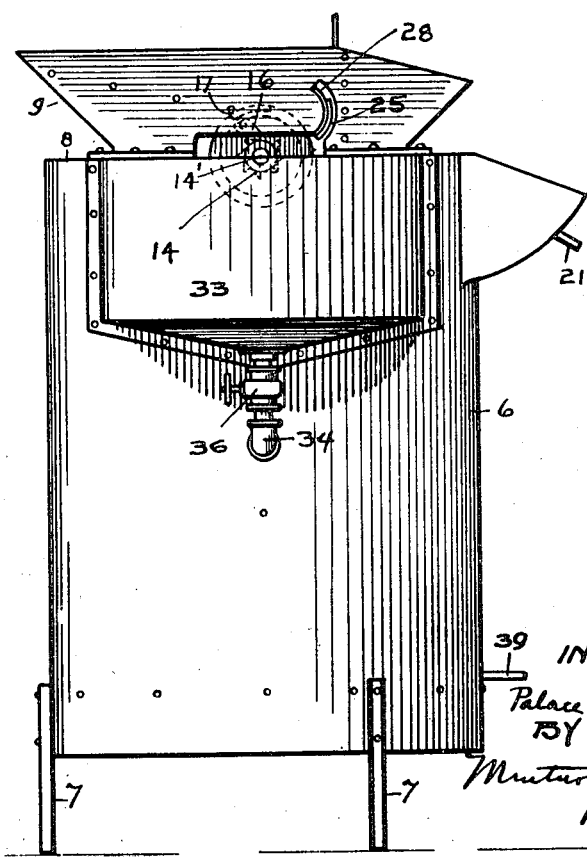

Figure 1 is a top plan view of my invention. Fig. 2, a side elevation of same. Fig. 3, a vertical section on the line 3—3 of Fig. 1. Fig. 4, a vertical section on the line 4—4 of Fig. 1, and Fig. 5 a perspective view of the movable slide for regulating the cement discharge.

Like characters of reference indicate like parts throughout the several views of the drawings.

The body of my machine is comprised of the sheet-metal cylinder or drum 6 the lower end of which is mounted any suitable distance above the ground or floor on legs 7, or if desired, upon wheels (not shown). The top of the drum will preferably have a cover 8 upon which is a hopper 9 separated by a vertical partition 10 into compartments 11 and 12. The larger compartment 11 is supplied with cement which discharges through a bottom opening into the drum 6. A portion of the discharge opening is occupied by a feed roll 13 mounted on a shaft 14' suitably journaled to the walls of the hopper or to the drum 6, as shown. Secured to each end of roll 13 is a ratchet wheel 14 and mounted on the shaft near each ratchet wheel and rotating with the shaft are disks 15 carrying pawls 16 which engage the respective adjacent ratchet wheels 14. These disks have flanges 17 projecting over the pawls to keep the latter from dropping down should they accidentally slip off of their ratchet wheels. The smaller compartment 12 of the hopper is where the sand or gravel is deposited by the shovelful. It has a bottom discharge which is closed by a plate 20 which is hinged to the under side of the cover 8. The weighted bar 21 extending out from the plate holds the inner edge of the plate in contact with the roller 13. The plate thus arrests the discharge of cement from the hopper 11.

When the weight of cement and sand on the plate overbalances the weight on bar 21 the plate swings down and dumps its load into the drum 6. The plate is connected by links 23 with the disks 15 so as to rock the latter by the swinging of the plate. The rocking of the disks rotates the roller 13 which positively feeds a new charge of cement down upon the plate 20. The roller may be corrugated as shown to make the feed more positive.

In order to regulate the size of the throat through which the cement discharges from the compartment 11 to the plate 20 I provide a valve or damper 25, which is a sheet-metal plate extending longitudinally of the feed roll, and outside of the hopper for convenient manipulation. This plate is concave in cross-section and works in contact with a curved stationary plate 27 carried by the partition 10. Upwardly oblique slots 28 in the plate 27 receive pins from the damper-plate 25, causing the latter to approach toward or to recede from the feed roll when moved longitudinally.

The weight on the bar 21 is adjustable longitudinally of the bar to enable the device to be set so the plate 20 will dump with different quantities of cement and sand on it as occasion may require. It will be noted that the weight of the cement to be dumped each time is supported by the plate 20 before the sand to complete the overbalance has been added.

When the quantity of cement and sand on the plate 20 overbalances the weight on the bar 21 the plate will swing down until arrested by the stop 27' and by so doing will dump its load which will fall upon the apex of a cone-spreader 28 supported by horizontal rods 29, in a funnel 30. The cone 28 so spreads the sand and cement that they are more thoroughly mixed when the ingredients are collected by the funnel 30.

The funnel 30 discharges upon a second cone-spreader 31 which, in turn is located within a second funnel 32 and the cement and sand are still more thoroughly mixed by these latter agencies.

A water reservoir 33 is provided from the bottom of which water is discharged through a pipe 34 to a horizontal annular pipe 35 located at the bottom of the upper funnel 30. The pipe 34 has a valve 36 to control the flow and the pipe 35 has perforations 37 through its inner wall through which jets of water discharge into the sand and cement to properly wet it.

The lower funnel will preferably be more contracted than the one above and its outlet is preferably equipped with a sliding plate 39 which serves as a valve for retaining the product of the machine when desired.

Having thus fully described my invention what I claim as new and wish to secure by Letters Patent, is—

1. A proportionate feed for a mixing device consisting of two hoppers, one of which is provided with a movable discharger, a balanced receiving pan below the discharge opening of both of said hoppers, and means connected with said movable discharger and pan by which both are simultaneously operated.

2. A proportionate feed for a mixing device consisting of two hoppers, one of which is provided with a rotary discharger, a balanced receiving pan below the discharge opening of both of said hoppers, and means connected with said rotary discharger and pan by which both are simultaneously operated.

3. A proportionate feed for a mixing device consisting of two hoppers, one of which is provided with a discharge roller and means to regulate its output or discharge, a balanced receiving pan below the discharge openings of said hoppers, and means connected with said roller and pan by which both are simultaneously operated.

4. A proportionate feed for a mixing device consisting of two hoppers, one of which is provided with a discharge roller and an adjustable valve plate curved in cross-section to regulate its output or discharge, a balanced receiving pan below the discharge openings of said hoppers, and means connected with said roller and pan by which both are simultaneously operated.

5. A proportionate feed for a mixing device consisting of two hoppers, one of which is provided with a discharge roller having ratchet wheels and an adjustable valve plate curved in cross-section to regulate its output or discharge, a balanced receiving pan below the discharge openings of said hoppers, pawls engaging the ratchet wheels of said rollers, disks carrying said pawls and links connecting the disks and pan.

In witness whereof, I, have hereunto set my hand and seal at Indianapolis, Indiana, this 6th day of March, A. D. one thousand nine hundred and twelve.

PALACE BUTLER. [L. S.]

Witnesses:
JOSEPH A. MINTURN,
GUY R. ELLIOTT.